United States Patent
Luo et al.

(10) Patent No.: US 11,613,199 B2
(45) Date of Patent: *Mar. 28, 2023

(54) COVER ASSEMBLY WITH LOCK MECHANISM

(71) Applicants: Tianjin Regis Star Group Co., Ltd, Tianjin (CN); Foshan City Manyin Auto Technology Co., Ltd, Tianjin (CN)

(72) Inventors: Liling Luo, Tianjin (CN); Chaochao Deng, Tianjin (CN)

(73) Assignees: TIANJIN REGIS STAR GROUP CO., LTD, Tianjin (CN); FOSHAN CITY MANYIN AUTO TECHNOLOGY CO., LTD, Tianjin (CN)

(*) Notice: Subject to any disclaimer, the term of this patent is extended or adjusted under 35 U.S.C. 154(b) by 30 days.

This patent is subject to a terminal disclaimer.

(21) Appl. No.: 17/225,552

(22) Filed: Apr. 8, 2021

(65) Prior Publication Data

US 2022/0185169 A1 Jun. 16, 2022

Related U.S. Application Data

(63) Continuation of application No. 17/119,724, filed on Dec. 11, 2020, now Pat. No. 10,994,648.

(51) Int. Cl.
*B60P 7/02* (2006.01)
*B60J 7/14* (2006.01)
*B60J 7/19* (2006.01)

(52) U.S. Cl.
CPC ............... *B60P 7/02* (2013.01); *B60J 7/141* (2013.01); *B60J 7/198* (2013.01)

(58) Field of Classification Search
CPC .............. B60J 7/141; B60J 7/198; B60P 7/02
See application file for complete search history.

(56) References Cited

U.S. PATENT DOCUMENTS

| | | | |
|---|---|---|---|
| 9,067,481 B2* | 6/2015 | Xu | B60J 7/1607 |
| 10,106,022 B2* | 10/2018 | Xu | B60J 7/1858 |
| 10,286,765 B2* | 5/2019 | Williamson | B60P 7/00 |
| 10,994,648 B1* | 5/2021 | Luo | B60P 7/02 |
| 11,148,512 B2* | 10/2021 | Shi | B60J 7/198 |
| 11,186,151 B1* | 11/2021 | Xu | B60J 7/198 |
| 11,299,021 B2* | 4/2022 | Dylewski, II | B60J 7/1607 |
| 11,312,216 B1* | 4/2022 | Lin | B60J 7/141 |

(Continued)

*Primary Examiner* — Gregory A Blankenship
(74) *Attorney, Agent, or Firm* — Getech Law LLC; Jun Ye

(57) ABSTRACT

A cover assembly for covering a bed of a vehicle has a first panel fixedly attached to a bed of the vehicle and at least one movable panel adapted to pivot between an open position and a folded position. The cover assembly also includes a pair of rails attached to a pair of sidewalls of the vehicle. Each rail includes a first portion engaged with a sidewall and a second portion defining a catch therebetween. The cover assembly also includes a lock assembly for locking the movable panel in the open position. The lock assembly includes a lock member adapted to move between a lock position and an unlock position. In the lock position, the lock member is engaged with the catch and locks the movable panel in the open position. In the unlock position, the lock member is arranged away from the catch.

18 Claims, 16 Drawing Sheets

(56) References Cited

U.S. PATENT DOCUMENTS

| | | | |
|---|---|---|---|
| 2007/0210609 A1* | 9/2007 | Maimin | B60J 7/141 |
| | | | 296/100.09 |
| 2015/0123421 A1* | 5/2015 | Combs, II | B60J 7/198 |
| | | | 296/100.02 |
| 2017/0240033 A1* | 8/2017 | Dylewski, II | B60J 7/141 |
| 2018/0147925 A1* | 5/2018 | Williamson | B60J 7/141 |
| 2019/0126734 A1* | 5/2019 | Dylewski, II | B60J 7/198 |
| 2020/0180415 A1* | 6/2020 | Spencer | B60P 7/02 |
| 2020/0331329 A1* | 10/2020 | Schmeichel | B60J 7/198 |
| 2021/0016646 A1* | 1/2021 | Dylewski, II | B60J 7/141 |
| 2021/0114446 A1* | 4/2021 | Schmeichel | B60J 7/041 |
| 2022/0055462 A1* | 2/2022 | Xu | B60J 7/198 |
| 2022/0185169 A1* | 6/2022 | Luo | B60J 7/141 |
| 2022/0219516 A1* | 7/2022 | Schmeichel | B60J 7/141 |
| 2022/0227211 A1* | 7/2022 | Dylewski, II | B60J 7/141 |

* cited by examiner

COVER ASSEMBLY WITH LOCK MECHANISM

CROSS-REFERENCE TO RELATED APPLICATION

This application is a continuation of U.S. patent application Ser. No. 17/119,724, filed Dec. 11, 2020, titled "COVER ASSEMBLY FOR A BED OF A VEHICLE", the content of which application is hereby expressly incorporated herein by reference.

TECHNICAL FILED

The present disclosure relates, generally, to a cover assembly for covering a bed of a vehicle, and more particularly relates to a cover assembly for a bed of a truck and having a cover adapted to move between an open position covering the bed and a folded position.

BACKGROUND

Vehicles, such as, trucks, generally include payload beds disposed at a rear of the vehicle to store and transport goods. Typically, the payload beds are open from top, and therefore, the goods arranged inside the bed may get spoiled due to dust and/or rain. To prevent the goods from the dust and/or the rain, a cover is generally disposed over the bed and the goods during transportation. However, assembling and removing the cover on the bed is a time consuming and a laborious task. In certain other scenarios, the vehicle includes a cover fixedly installed on the entire payload bed. Although the fixedly attached cover prevents the goods arranged in the payload bed from damage due to dust and/or rain, the payload bed cannot accommodate goods having heights greater than certain heights, thereby reducing a capacity of the vehicle to transport goods, which is undesirable.

SUMMARY

In accordance with one embodiment of the present disclosure, a cover assembly for a vehicle is provided. The cover assembly covers a bed of a vehicle. The bed includes a base and a pair of sidewalls extending outwardly of the base and defines a storage space therebetween. The cover assembly includes a plurality of panels having a first panel adapted to be fixedly attached to the bed and at least one movable panel adapted to pivot between an open position and a folded position. The cover assembly further includes a pair of rails adapted to extend along the pair of sidewalls and adapted to attach to the pair of sidewalls. Each rail includes a first portion adapted to engage with a corresponding sidewall of the pair of sidewalls and having a T-shaped structure, and a second portion extending from the first portion and defining a catch therebetween. The cover assembly further includes at least one lock assembly for locking the at least one movable panel in the open position in. The at least one lock assembly includes at least one lock member adapted to move between a lock position and an unlock position. In the lock position, the at least one lock member is engaged with the catch of at least one of the pair of rails and locks the at least one movable panel in the open position. In the unlock position, the at least one lock member is arranged way from the catch to enable the pivoting of the at least one movable panel from the open position to the folded position.

In accordance with another embodiment of the present disclosure, a vehicle is provided. The vehicle includes a bed having a base and a pair of sidewalls extending outwardly of the base and defining a storage space therebetween. The vehicle also includes a plurality of panels having a first panel fixedly attached to the bed and at least one movable panel adapted to pivot between an open position and a folded position. The vehicle further includes a pair of rails extending along the pair of sidewalls and attached to the pair of sidewalls. Each rail includes a first portion engaged with a corresponding sidewall of the pair of sidewalls and having a T-shaped structure, and a second portion extending from the first portion and defines a catch therebetween. The vehicle further includes at least one lock assembly for locking the at least one movable panel in the open position in. The at least one lock assembly includes at least one lock member adapted to move between a lock position and an unlock position. In the lock position, the at least one lock member is engaged with the catch of at least one of the pair of rails and locks the at least one movable panel in the open position. In the unlock position, the at least one lock member is arranged way from the catch to enable the pivoting of the at least one movable panel from the open position to the folded position.

DETAILED DISCRIPTION

Figure 1:
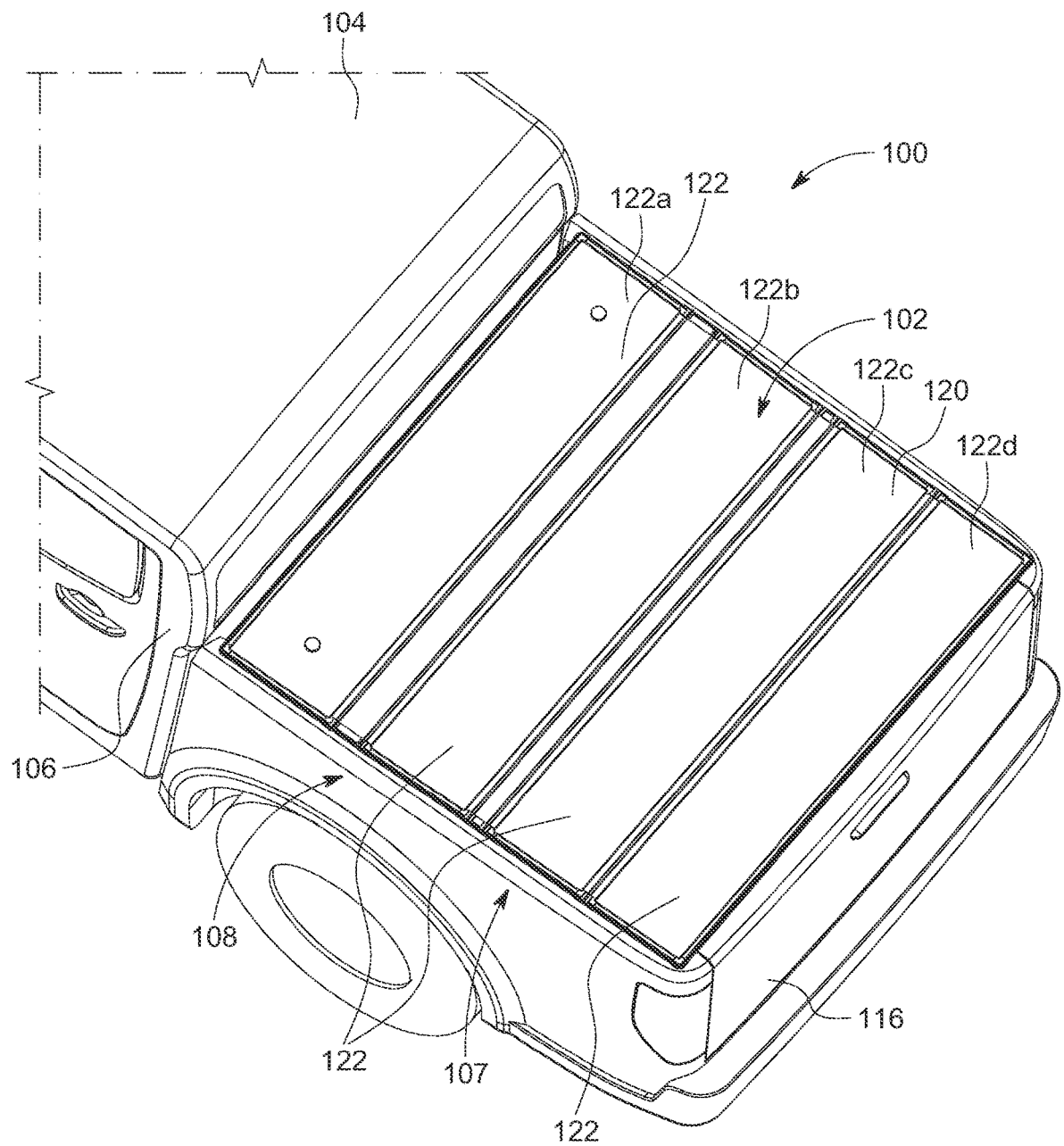
FIG. 1 illustrates a perspective view of a rear portion of a vehicle having a cover assembly with a cover arranged in an open position, in accordance with an embodiment of the disclosure.

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. The, use of any term should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 2:
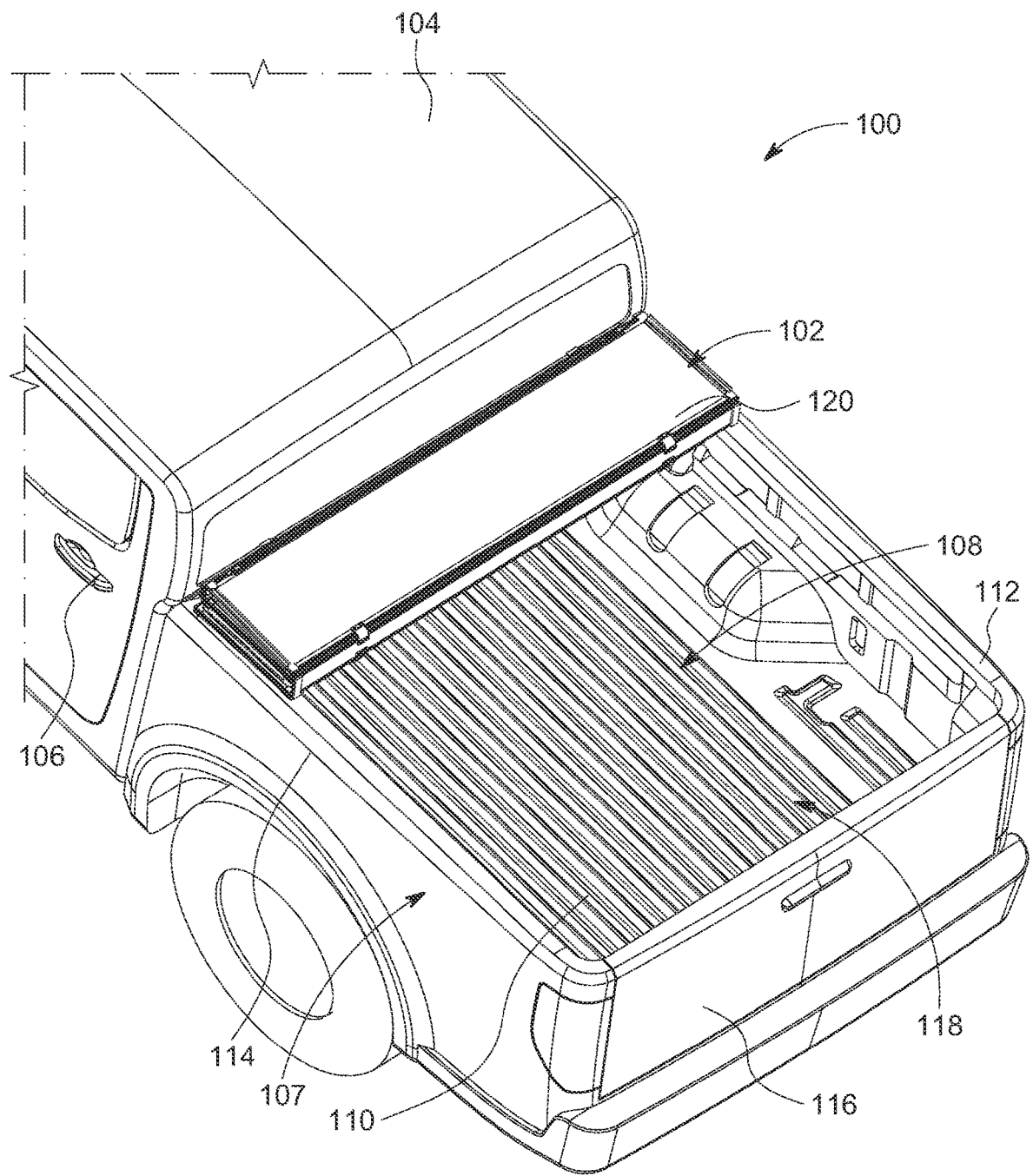
FIG. 2 illustrates a perspective view of the rear portion of the vehicle having the cover assembly with the cover arranged in a folded position, in accordance with an embodiment of the disclosure.

Referring to FIGS. 1 and 2, a vehicle 100 having a cover assembly 102 is shown. The vehicle 100 may be a truck or any other vehicle suitable for transporting passengers or goods, and may include a front portion 104 having a cabin 106 for facilitating a seating of a driver and one or more passage, and a rear portion 107 having a bed 108 for receiving goods. The bed 108 extends from the cabin 106 to a rear end of the vehicle 100, and may include a base 110, a pair of sidewalls 112, 114 extending outwardly and away from the base 110, and a tailgate 116 extending between the pair of sidewalls 112, 114 and adapted to move between a closed position and an open position. The bed 108 defines a space 118 between the cabin 106, the sidewalls 112, 114, the base 110, and the tailgate 116 for storing or holding goods. Further, vehicle 100 includes a cover 120 attached to the sidewalls 112, 114 and adapted to cover the space 118 from a top in an open position (as shown in FIG. 1), and is adapted to move to a folded position (as shown in FIG. 2) to provide an access of the space 118 from the top.

As shown in FIG. 1, the cover assembly 102 includes the cover 120 having a plurality of panels 122 engaged to each other and supported on the sidewalls 112, 114 of the bed 108. The plurality of panels 122 includes a fixed panel 122a (also referred to as first panel 122a) fixedly attached to the bed 108 and disposed substantially parallel to the base 110, and at least one movable panel, for example, a second panel 122b, a third panel 122c, and a fourth panel 122d, adapted to move between a first position (folded position) and a second position (an open position) relative to the adjacent/neighboring panel 122. As shown the first panel 122a is disposed rearwardly of the tailgate 116 and proximate to the cabin 106, while the fourth panel 122d is arranged proximate to the tailgate 116 in the open position of the cover 120. Accordingly, the second panel 122b and the third panel 122c are linearly arrayed between the first panel 122a and the fourth panel 122d in the open position of the cover 120, while in the close position, the movable panels 122b, 122c, 122d are stacked above the fixed panel 122a. Further, each of the panels 122 extends from the first sidewall 112 to the second sidewall 114 to cover a portion of the bed 108. Although only three movable panels 122b, 122c, 122d are contemplated and shown, it may be envisioned that the cover 120 may include any number of movable panels. The number of movable panels depends upon a length of the bed 108.

Figure 3:
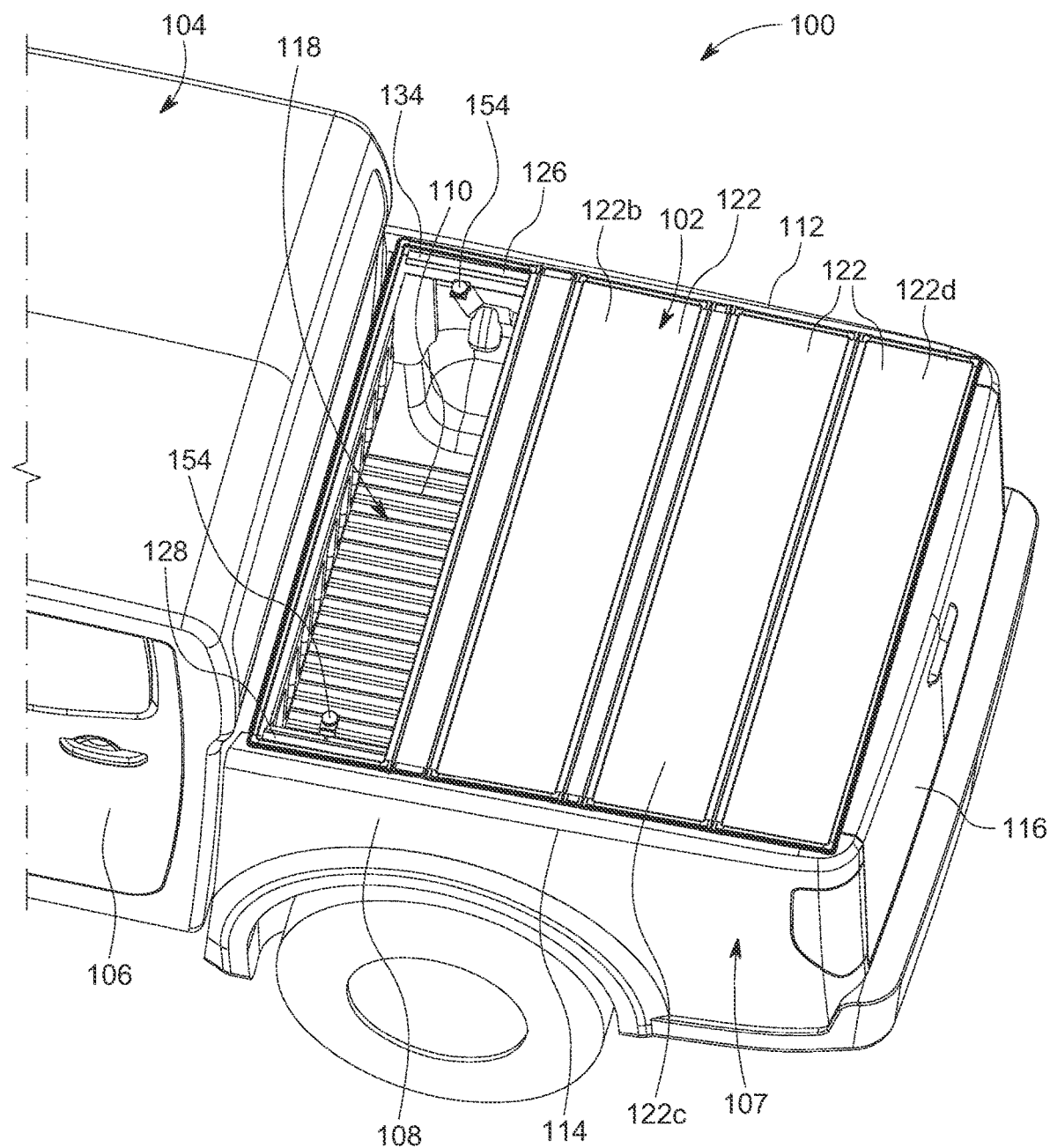
FIG. 3 illustrates a perspective view of the rear portion of the vehicle having the cover assembly with the cover from which a first panel of the cover removed, in accordance with an embodiment of the disclosure.

Referring to FIG. 3, to engage the cover 120 with the sidewalls 112, 114, the cover assembly 102 includes a pair of rails, for example, a first rail 126 attached to the first sidewall 112, and a second rail 128 attached to the second sidewall 114. The first rail 126 extends along a length of the first sidewall 112 and extends inwardly of the first sidewall 112 inside the space 118, and the second rail 128 extends substantially parallel to the first rail 126 along a length of the second sidewall 114 and extends inwardly of the second sidewall 114 inside the space 118. The first rail 126 and the second rail 128 are identical in structure, connection, assembly, and function, and therefore, for the sake of clarity and brevity, a construction, a structure, an assembly, and a function of only the first rail 126 is described.

Figure 4:
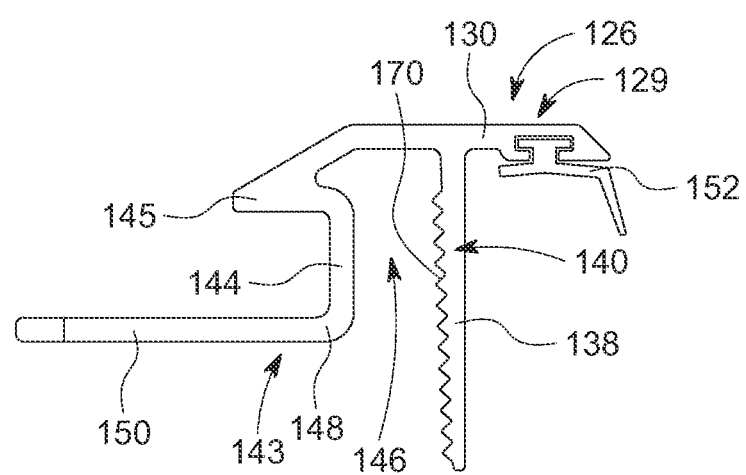
FIG. 4 illustrates a cross-sectional view of a first rail of the cover assembly, in accordance with an embodiment of the disclosure.
Figure 5:
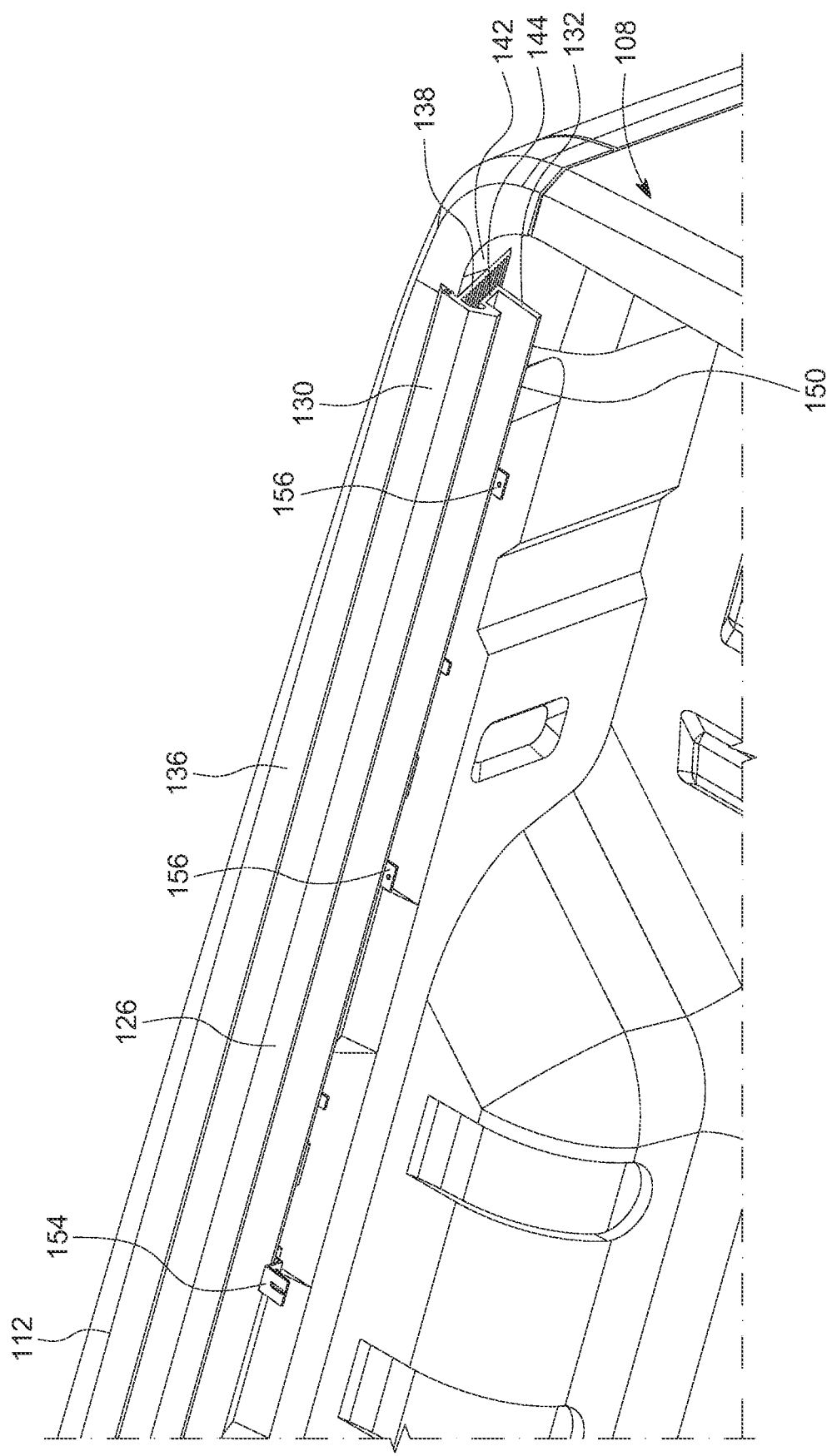
FIG. 5 illustrates an enlarged perspective view of a part of the rear portion of the vehicle depicting the first rail engaged with a first sidewall of a bed of a vehicle via a first clamp and two second clamps, in accordance with an embodiment of the disclosure.
Figure 6:
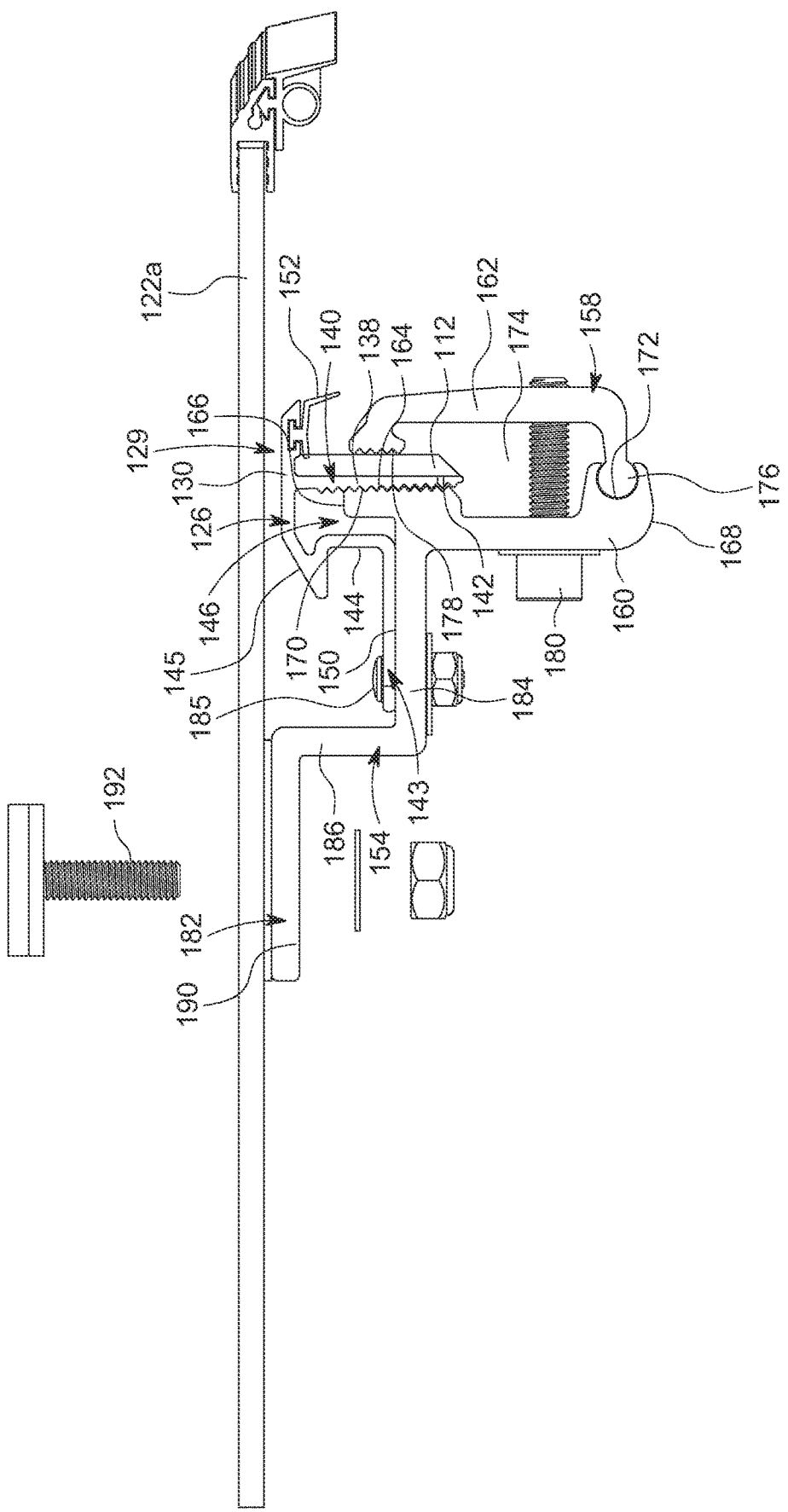
FIG. 6 illustrates a sectional view of the cover assembly depicting the first clamp engaged with the first rail and the first panel, in accordance with an embodiment of the disclosure.

Referring to FIG. 4, a cross-sectional view of the first rail 126 is shown. As shown, the first rail 126 includes a first portion 129 having a first elongated member 130 extending from a first longitudinal end 132 to a second longitudinal end 134 of the first rail 126 and adapted to engage with a top surface 136 of the first sidewall 112, and a second elongated member 138 extending substantially perpendicularly and downwardly of the first elongated member 130. As shown in FIG. 4, the first elongated member 130 and the second elongated member 138 are arranged to define a substantially a T-shaped structure 140. Also, as shown in FIGS. 5 and 6, the second elongated member 138 is adapted to abut a side surface 142 of the first sidewall 112 in an assembly of the first rail 126 with the first sidewall 112. Further, the first rail 126 includes a second portion 143 having a third elongated member 144 arranged space apart and substantially parallel to the second elongated member 138, thereby defining an elongated channel 146 therebetween. Accordingly, the third elongated member 144 may extend downwardly and substantially perpendicularly from a lateral end of the first elongated member 130. In some implementations, the third elongated member 144 may be connected to the first elongated member 130 at a location inwardly of the lateral end of first elongated member 130. Accordingly, the first elongated member 130 defines a catch 145 between the lateral end and the third elongated member 144. In an embodiment, a height of the third elongated member 144 may be smaller than a height of the second elongated member 138 such that a free end 148 of the third elongated member 144 is disposed proximate to the first elongated member 130 relative to a free end of the second elongated member 138. In this manner, the elongated channel 146 is an inverted U-shaped channel.

Additionally, the second portion 143 may include a fourth elongated member 150 extending perpendicularly from the free end 148 of the third elongated member 144 in a direction away from the elongated channel 146. It may be appreciated that the fourth elongated member 150 is disposed at a vertical distance from the first elongated member 130. Accordingly, the first elongated member 130 and the fourth elongated member 150 extend opposite to each other from the third elongated member 144. As shown in FIGS. 5 and 6, in an assembly of the first rail 126 with the first sidewall 112, the fourth elongated member 150 extends inside the bed 108 and away from the first sidewall 112, and is arranged substantially parallel to the base 110. The fourth elongated member 150 is coupled to the panels 122 of the cover 120 and supports the cover 120 on the first sidewall 112. Additionally, or optionally, the cover assembly 102 may include a seal 152 arranged between the top surface 136 of the first sidewall 112 and the first elongated member 130 to prevent an ingress of the dust or fluid inside the space 118. In embodiment, as shown in FIG. 5, the cover assembly 102 includes a first clamp 154 and a plurality of second clamps 156 for attaching/engaging/coupling first rail 126 to the first sidewall 112.

As shown in FIG. 6, the first clamp 154 includes a first structure 158 that has a first rod 160 and a second rod 162 rotatably engaged with the first rod 160. As shown in FIG. 6, the first rod 160 is adapted be inserted inside the elongated channel 146 and adapted to engage with the second elongated member 138 of the first rail 126. In an assembly, the first rod 160 extends vertically and substantially parallel to the second elongated member 138 and abuts the second elongated member 138. In an embodiment, the first rod 160 may include a plurality of teeth 164 extending from a top end 166 towards a bottom end 168 and arrayed along, at least, a part of the length of the first rod 160 and adapted to engage with teeth 170 of the second elongated member 138 to facilitate a positive engagement and retention of the first rod 160 with the second elongated member 138. Also, the first rod 160 defines a hemi-spherical socket 172 at the bottom end 168 to receive the second rod 162. The second rod 162 is attached to the first rod 160 in such a manner that a U-shaped channel 174 is defined therebetween when the first clamp 154 is engaged with the first rail 126 and the first sidewall 112. The second rod 162 is adapted to engage with the first sidewall 112 such that the first sidewall 112 is at least partially arranged inside the U-shaped channel 174. Further, as shown, the second rod 162 includes a ball portion 176 disposed at a lower end of the second rod 162. The ball portion 176 is arranged inside the socket 172 thereby forming a ball socket type joint between the first rod 160 and the second rod 162. It may be envisioned that the second rod 162 is adapted to move/rotate relative to the first rod 160 due to the ball socket type connection. Further, the second rod 162 may include a serrated portion 178 arranged at an upper end of the second rod 162. The serrated portion 178 engages with the first sidewall 112 to couple the first clamp 154 with the first sidewall 112. Further, the first clamp 154 includes a fastener 180, such as a threaded bolt that extends through the first rod 160 and the second rod 162 to tighten and engage the first rod 160 and the second rod 162 with the first rail 126 and first sidewall 112, respectively.

Additionally, the first clamp 154 may include a second structure 182 having a substantially Z-shape with a first member 184 extending substantially perpendicularly from the first rod 160 and away from the U-shaped channel 174. As shown, the first member 184 is adapted to engage with the fourth elongated member 150 of the first rail 126. In an embodiment, the first member 184 is attached to the fourth elongated member 150 by using a fastener 185. Further, the second structure 182 includes a second member 186 connected to the first member 184 and extending substantially vertically from the first member 184, and a third member 190 connected to the second member 186 and arranged substantially horizontally relative to the second member 186. Accordingly, the second member 186 is disposed between the first member 184 and the third member 190 such that the first member 184 and the third member 190 extend in opposite direction from the second member 186. As shown, the third member 190 supports the first panel 122*a* and is coupled to the first panel 122*a* via a fastener 192. In this manner, the first clamp 154 engages the first panel 122*a* with the first rail 126 and thus with the first sidewall 112. Similarly, another first clamp (not shown) engages the second rail 128 with the second sidewall 114 and the first panel 122*a* with the second siderail 128.

Figure 7:
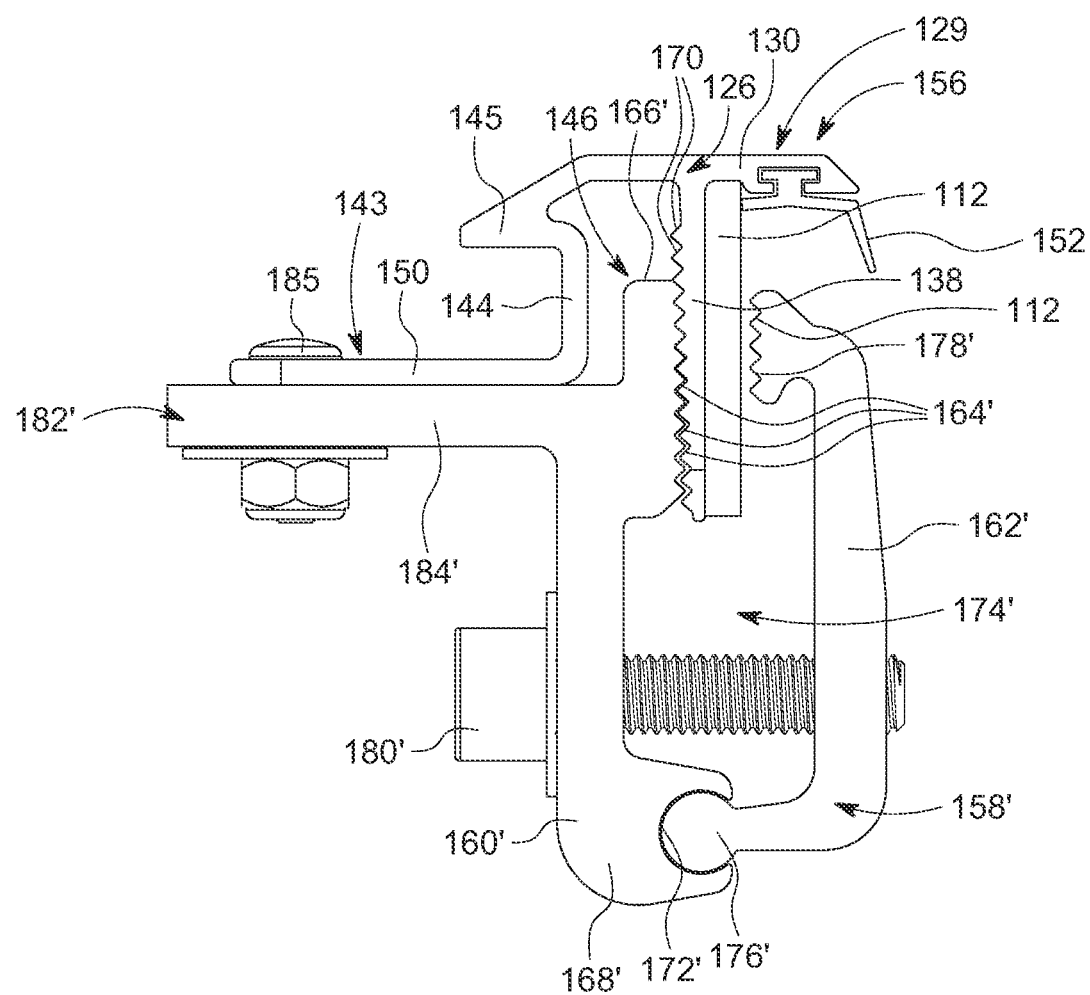
FIG. 7 illustrates a sectional view of the cover assembly depicting the second clamp engaged with the first rail and the first sidewall, in accordance with an embodiment of the disclosure.

Referring to FIG. 7, the second clamp 156 is shown. The second clamp 156 attaches/couples the first rail 126 with the first sidewall 112 and is similar in structure to the first clamp 154 except that a second structure 182' of the second clamp 156 includes only a first member 184', and the second member 186 and the third member 190 are omitted from the second clamp 156. Accordingly, the second clamp 156 includes a first structure 158' having a first rod 160' and a second rod 162' rotatably engaged with the first rod 160'. As shown, the first rod 160' includes a top end 166', a bottom end 168', a plurality of teeth 164' arrayed downwardly from the top end 166' towards the bottom end 168', and a hemi-spherical socket 172' arranged at the bottom end 168'. Similarly, the second rod 162' include a serrated portion 178' arranged at an upper end, and a ball portion 176' arranged at a lower end and disposed inside the socket 172'. Further, the second rod 162' is attached to the first rod 160' in such a manner that a U-shaped channel 174' is defined therebetween when the second clamp 156 is engaged with the first rail 126 and the first sidewall 112. Moreover, the second clamp 156 includes a threaded fastener 180' to tighten the first rod 160' and the second rod 162' with the first rail 126 and the first sidewall 112, respectively, to couple/attach the first rail 126 to the first sidewall 112. Although two second clamps 156 are shown and contemplated to engage the first rail 126 with the first sidewall 112, it may be appreciated that the cover assembly 102 may include any number of second clamps 156 to engage/couple/attach/retain the first rail 126 with the first sidewall 112 depending on a length of the first rail and/or the cover 120. Similarly, two second clamps 156 attaches/engages the second rail 128 with the second sidewall 114.

Figure 8:
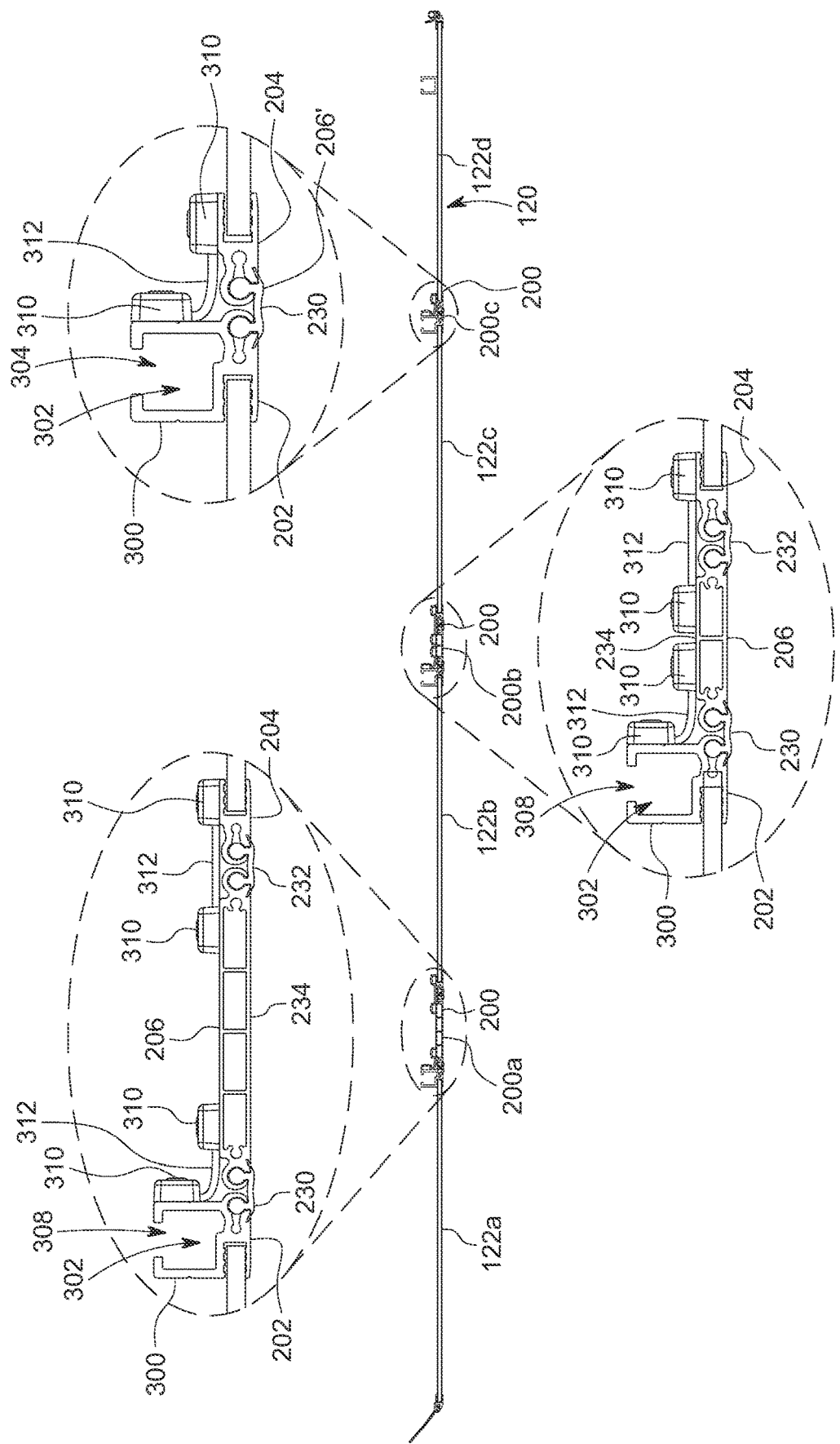
FIG. 8 illustrates side view of the cover depicting a plurality of couplers engaging a plurality of panels of the cover, in accordance with an embodiment of the disclosure.
Figure 9:
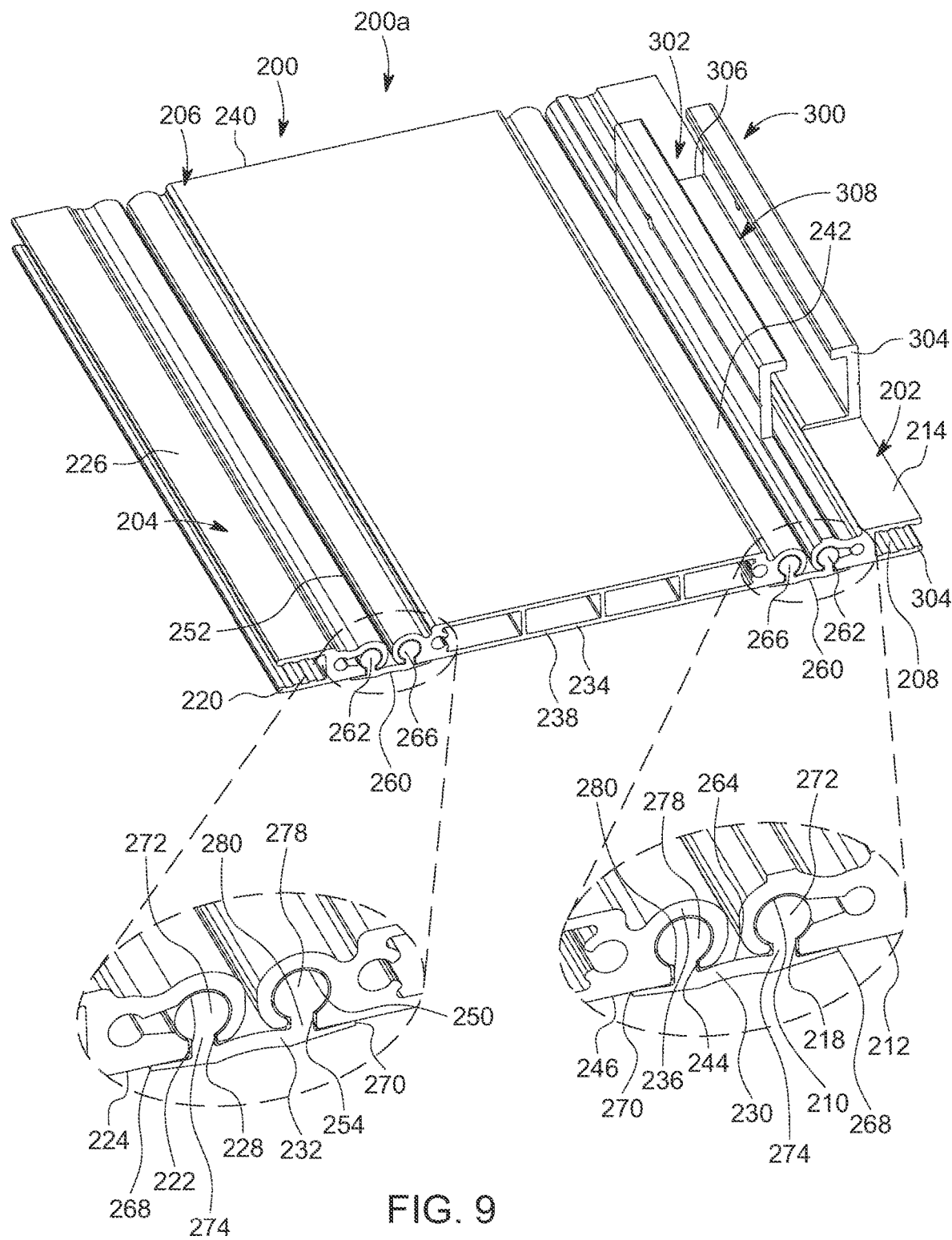
FIG. 9 illustrates a bottom perspective view of a first coupler of the plurality of couplers, in accordance with an embodiment of the disclosure.

Referring to FIG. 8, a side view of the cover 120 arranged in the open position is shown. As shown, the cover 120 includes a plurality of couplers 200 for engaging the two adjacent panels 122 and facilitating a movement of movable panels 122b, 122c, 122d between the open position and the folded position. In an embodiment, the plurality of couplers 200 includes a first coupler 200a pivotally engaging the second panel 122b with the first panel 122a, a second coupler 200b pivotally engaging the third panel 122c with the second panel 122b, and a third coupler 200c pivotally engaging the fourth panel 122d with the third panel 122c. Referring to FIG. 8 and FIG. 9, the first coupler 200a includes a first engagement structure 202 engaged with the first panel 122a, a second engagement structure 204 engaged with the third panel 122b, and a hinge structure 206 coupled with the first engagement structure 202 and the second engagement structure 204 and adapted to facilitate the pivotal movement of the second panel 122b relative to the first panel 122a between the open position and the folded position. As shown, the first engagement structure 202 includes a jaw 208 to receive a portion of the first panel 122a and an elongated groove 210 extending along an entire length of the first engagement structure 202 and from an upper surface 212 towards a bottom surface 214. As shown, the groove 210 is a cylindrical groove and includes an elongated opening 218 defined at the upper surface 212 to provide an access of the groove 210 from the upper surface 212. Similar to the first engagement structure 202, the second engagement structure 204 includes a jaw 220 to receive a portion of the second panel 122b an elongated groove 222 extending along an entire length of the second engagement structure 204 and from an upper surface 224 towards a bottom surface 226. As shown, the elongated groove 222 is cylindrical groove and includes an elongated opening 228 defined at the upper surface 224 to provide an access of the groove 222 from the upper surface 224.

Further, the hinge structure 206 may include at least one flexible member, for example, a first flexible member 230 and a second flexible member 232, adapted to overlap a portion of the first engagement structure 202 and the second engagement structure 204, and a plate structure 234 disposed between the pair of flexible members 230, 232 and connected/engaged with the flexible members 230, 232. As shown, the plate structure 234 includes a first elongated channel 236 extending from a first lateral end 238 to a second lateral end 240 and disposed proximate to the first longitudinal end 242 of the plate structure 234. The first elongated channel 236 may include a substantially cylindrical shape having an opening 244 defined at an upper surface 246 of the plate structure 234. Additionally, the plate structure 234 may include a second elongated channel 250 extending from the first lateral end 238 to the second lateral end 240 and disposed proximate to a second longitudinal end 252 of the plate structure 234. The second elongated channel 250 may include a substantially cylindrical shape having an opening 254 defined at the upper surface 246 of the plate structure 234. The first elongated channel 236 and the second elongated channel 250 facilitate the engagement of the plate structure 234 with the first flexible member 230 and the second flexible member 232 respectively. It may be appreciated that a structure, a connection, an assembly, and a function of the second flexible member 232 is identical to the first flexible member 230, and therefore, for the sake of clarity and brevity, a structure, a connection, and an assembly of only the first flexible member 230 is described.

Figure 11:
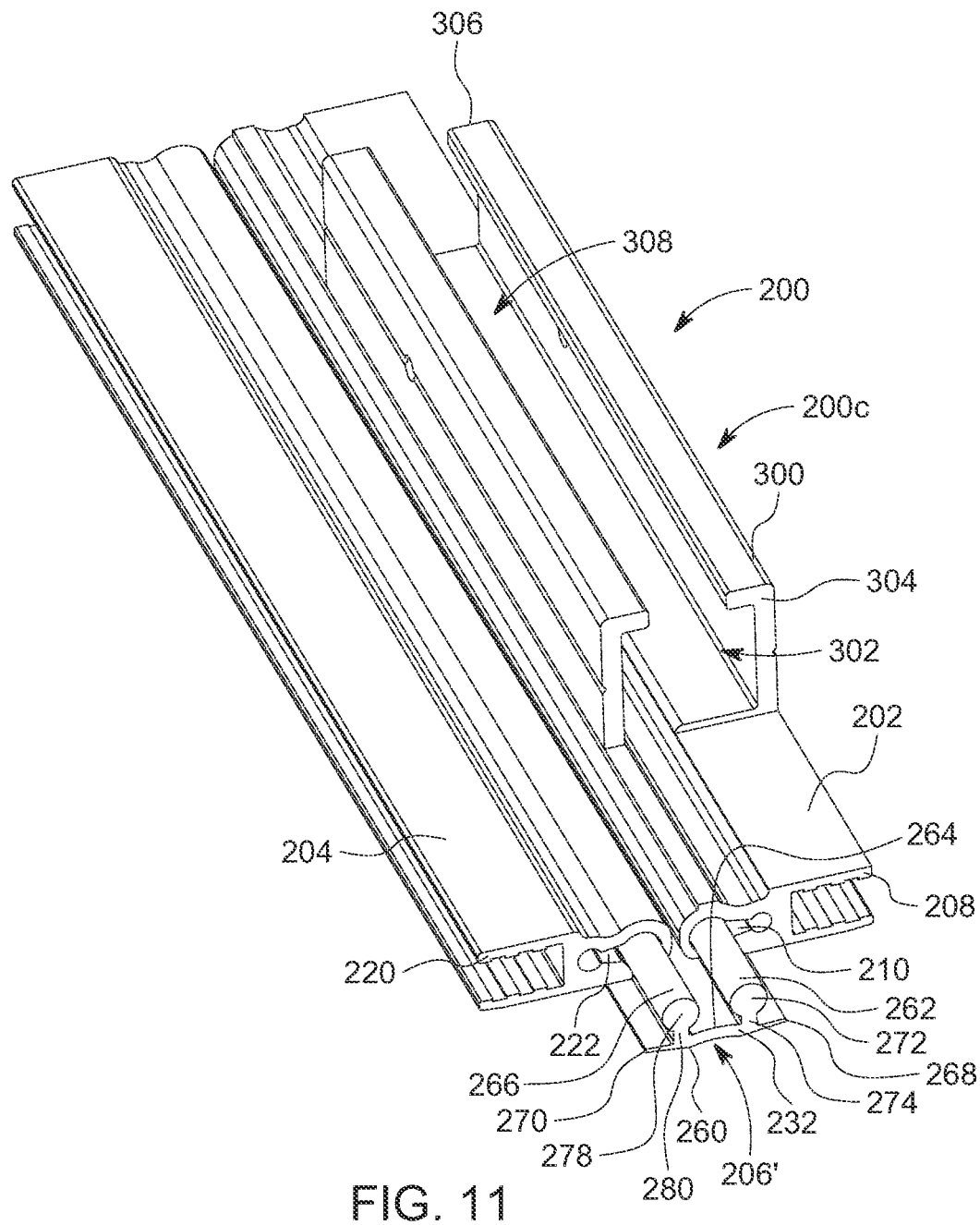
FIG. 11 illustrates a bottom perspective view of a third coupler of the plurality of couplers, in accordance with an embodiment of the disclosure.

As shown, the first flexible member 230 includes a flap member 260 adapted to extend between the first engagement structure 202 and the plate structure 234 and adapted to abut and overlap a portion of the upper surface 212 of the first engagement structure 202 and an upper surface 246 of the plate structure 234. Further, the first flexible member 230 includes a first protrusion 262 extending outwardly and downwardly from a lower surface 264 of the flap member 260, and a second protrusion 266 disposed spaced apart and substantially parallel to the first protrusion 262 and extending outwardly and downwardly from the lower surface 264 of the flap member 260. As shown, the first protrusion 262 is disposed inwardly and at an offset of a first longitudinal end 268 of the flap member 260, while the second protrusion 266 is arranged inwardly and at an offset from a second longitudinal end 270 of the flap member 260. As shown, the first protrusion 262 includes a cylindrical portion 272 disposed inside the elongated groove 210 of the first engagement structure 202 and a shank portion 274 connecting the cylindrical portion 272 to the lower surface 264 and extending through the opening 218 of the elongated groove 210. Similarly, the second protrusion 266 includes a cylindrical portion 278 disposed inside the first elongated channel 236 and a shank portion 280 connecting the cylindrical portion 278 to the lower surface 264 and extending through the opening 244 of the first elongated channel 236. Accordingly, the first protrusion 262 and the second protrusion 266 facilitate the engagement of the first engagement structure 202 with the plate structure 234. Similarly, a first protrusion 262 of the second flexible member 232 extends inside the elongated groove 222 of the second engagement structure 204, while a second protrusion of the second engagement structure 204 is arranged inside the second elongated channel 250 of the plate structure 234, thereby engaging the plate structure 234 with the second engagement structure 204. Also, a flap member 260 of the second flexible member 232 overlaps a portion of the second engagement structure 204 and the plate structure 234. It may be appreciated that the flexible members 230, 232 are made of a flexible material, such as, but not limited, to rubber, neoprene, etc., to facilitate a bending of the flap members 260 and hence folding of the second panel 122b relative to the first panel 122a. In some embodiments, the plate structure 234 may be omitted, as shown in FIG. 11 with reference to the third coupler 200c. In such case, a hinge structure 206' of the third coupler 200c includes only one flexible member, for example, the first flexible member 230 engaged with the first engagement structure 202 and the second engagement structure 204.

Additionally, the first engagement structure 202 includes a box structure 300 disposed downwardly of the jaw 208 and defines an elongated passage 302 extending along a part of a length of the first engagement structure 202 between a first lateral end 304 to a second lateral end 306 of the first engagement structure 202. The box structure 300 defines an access opening 308 to enable an access of the elongated passage 302 from bottom of the cover 120. In some embodiments, the hinge structure 206 may include a plurality of reinforcement structures 310 attached to the first engagement structure 202, the second engagement structure 204, and the plate structure 234 to provide additional rigidity to the components of the hinge structure 206. Further, the hinge structure 206 may include flexible reinforcing structures 312 arranged directly below the flexible members 230, 232 and connected to the adjacent reinforcement structures 310 to additional strength to the hinge structure 206 during pivoting and to prevent ingress of dust or rain water through the cover 120.

Figure 10:
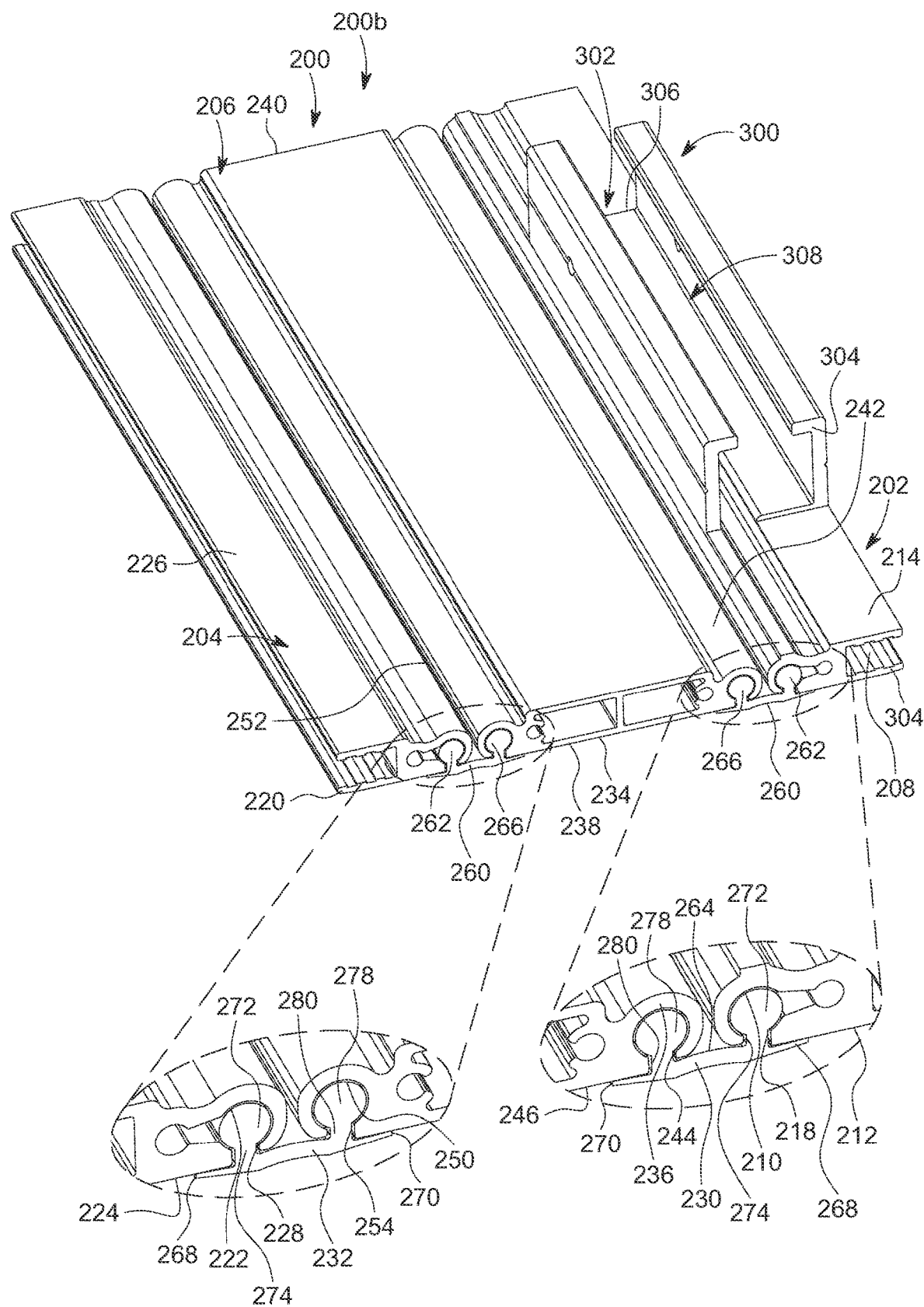
FIG. 10 illustrates a bottom perspective view of a second coupler of the plurality of couplers, in accordance with an embodiment of the disclosure.

Referring to FIG. 10, the second coupler 200b is shown in detail. The second coupler 200b is similar to the first coupler 200a except that a width 'w' of a plate structure 234 of the second coupler 200b is smaller than a width 'w' of the plate structure 234 of the first coupler 200a.

Referring to FIG. 11, the third coupler 200c is similar to the first coupler 200a except that a hinge structure 206' of the third coupler 200c includes only the first flexible member 230 and the second flexible member 232 and the plate structure 234 of the first coupler 200a is omitted from the third coupler 200c. Accordingly, the first protrusion 262 of the first flexible member 230 is disposed inside the elongated groove 210 of the first engagement structure 202 and the second protrusion 266 of the first flexible member 230 is disposed inside the elongated groove 222 of the second engagement structure 204.

Figure 12:
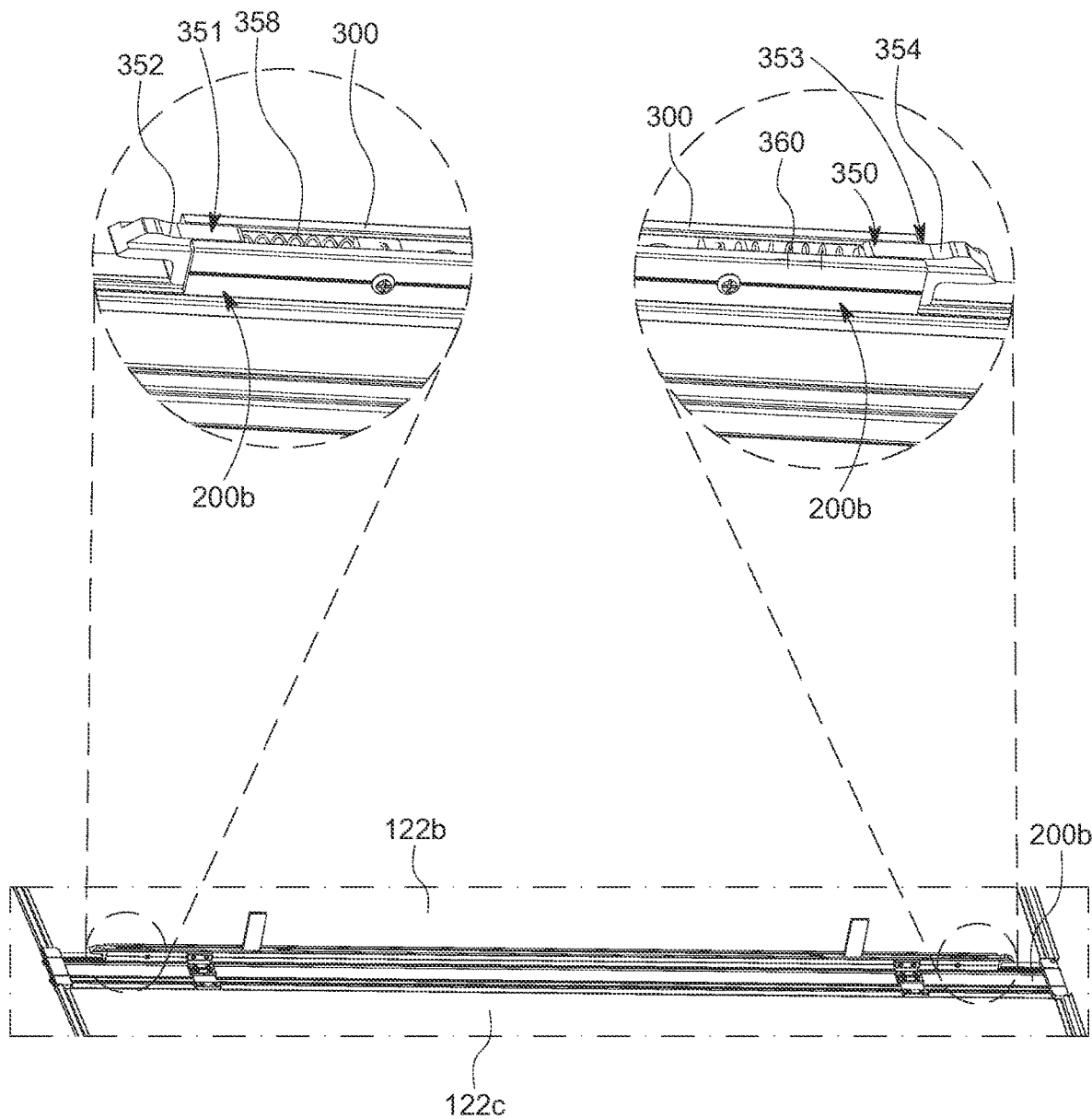
FIG. 12 illustrates bottom perspective of a portion of the cover depicting a lock assembly arranged inside the box structure of the second coupler for locking a second panel of the plurality of panel in an open position, in accordance with an embodiment of the disclosure.
Figure 13:
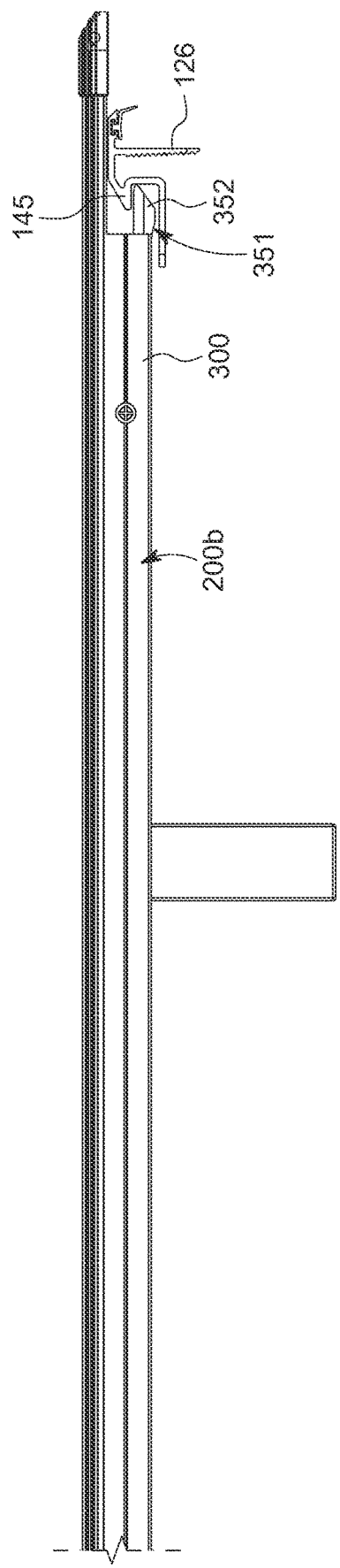
FIG. 13 illustrates a front view of the second coupler engaged with the second panel and depicting a first lock member of a first lock structure of the lock assembly in a lock position, in accordance with an embodiment of the disclosure.
Figure 14:
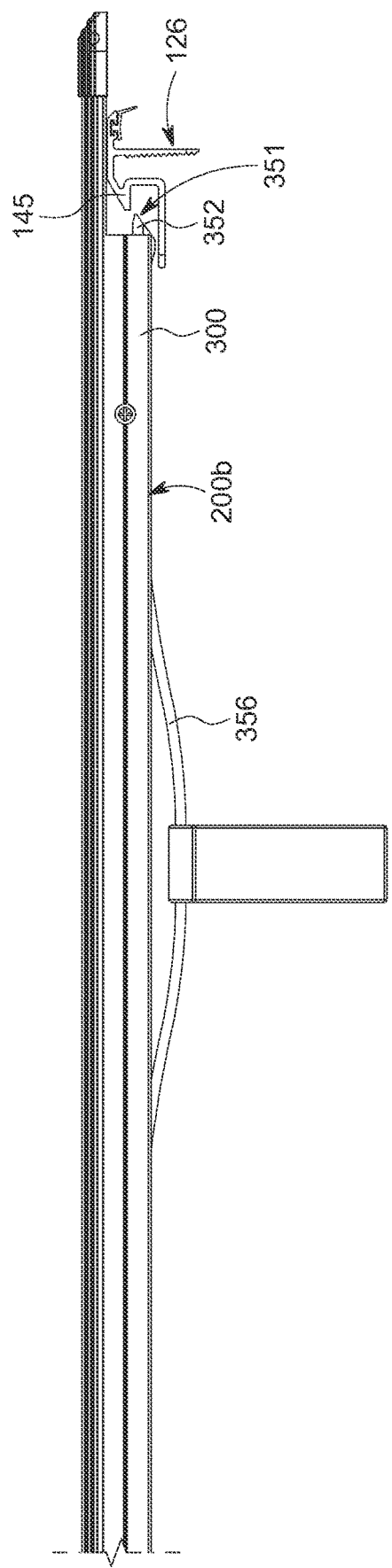
FIG. 14 illustrates a front view of the second coupler engaged with the second panel and depicting the first lock member of the lock assembly in an unlock position, in accordance with an embodiment of the disclosure.

Additionally, the cover assembly 102 includes a plurality of lock assemblies to lock the movable panels 122b, 122c, 122d in the open positions. Referring to FIG. 12, an exemplary lock assembly 350 for locking the second panel 122b in the open position is shown. As shown, in FIG. 12, the lock assembly 350 is engaged with the box structure 300 of the second coupler 200b and includes at least one lock structure, for example, a first lock structure 351 having a first lock member 352 and a second lock structure 353 having a second lock member 354. The first lock member 352 and the second lock member 354 are adapted to engage with the respective catch 145 of the rails 126, 128 to lock the movable panel, for example, the second panel 122b, with the rails 126, 128 in the open position, and adapted to move between a lock position (shown in FIG. 13) and an unlock position (shown in FIG. 14). In the lock position, the lock members 352, 354 are, partially, disposed outside the box structure 300 of the second coupler 200b and are engaged with the respective catch 145 of the rails 126, 128, while in the unlock position, each of the lock members 352, 354 moves inside the box structure 300 of the second coupler 200b and are disengaged from the respective catch 145 of the rails 126, 128. Further, the lock assembly 350 includes a string 356 (shown in FIG. 14) to pull/move the lock members 352, 354 from the lock position to the unlock position, and a first spring 358 and a second spring 360 to, respectively, bias the first lock member 352 and the second lock member 354 in the corresponding lock positions. Accordingly, the operator moves the lock members 352, 354 to the unlock positions by pulling the string 356. As shown the first spring 358 and the second spring 360 may be disposed inside the elongated passage 302 of the box structure 300 of the second coupler 200b, and are engaged to the respective lock members 352, 354. A structure and a function of the first lock structure 351 and the second lock structure 353 are identical, and therefore for the sake of clarity and brevity, the internal structure of only the first lock structure 361 is explained in detail.

Figure 15:
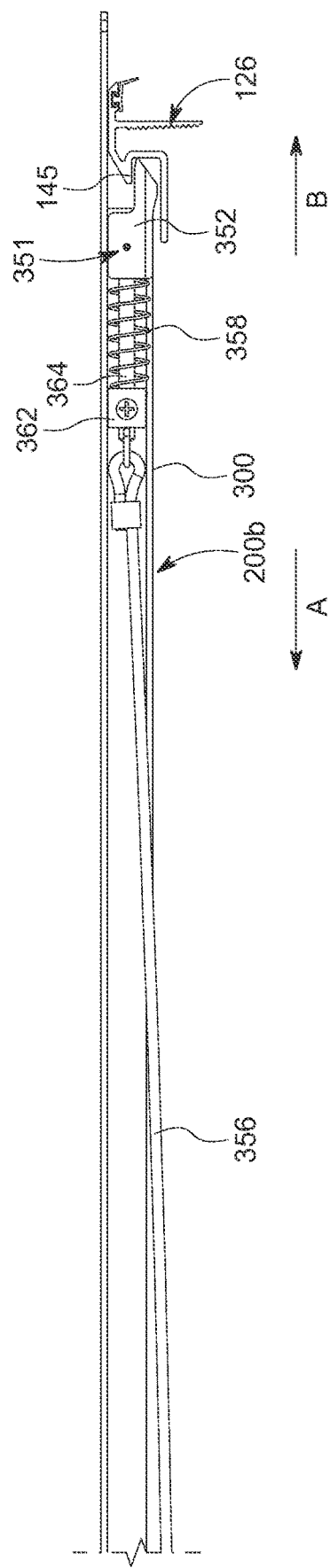
FIG. 15 illustrates a front section view of the second coupler engaged with the second panel and depicting various components of the first lock structure of the lock assembly of FIG. 13, in accordance with an embodiment of the disclosure.
Figure 16:
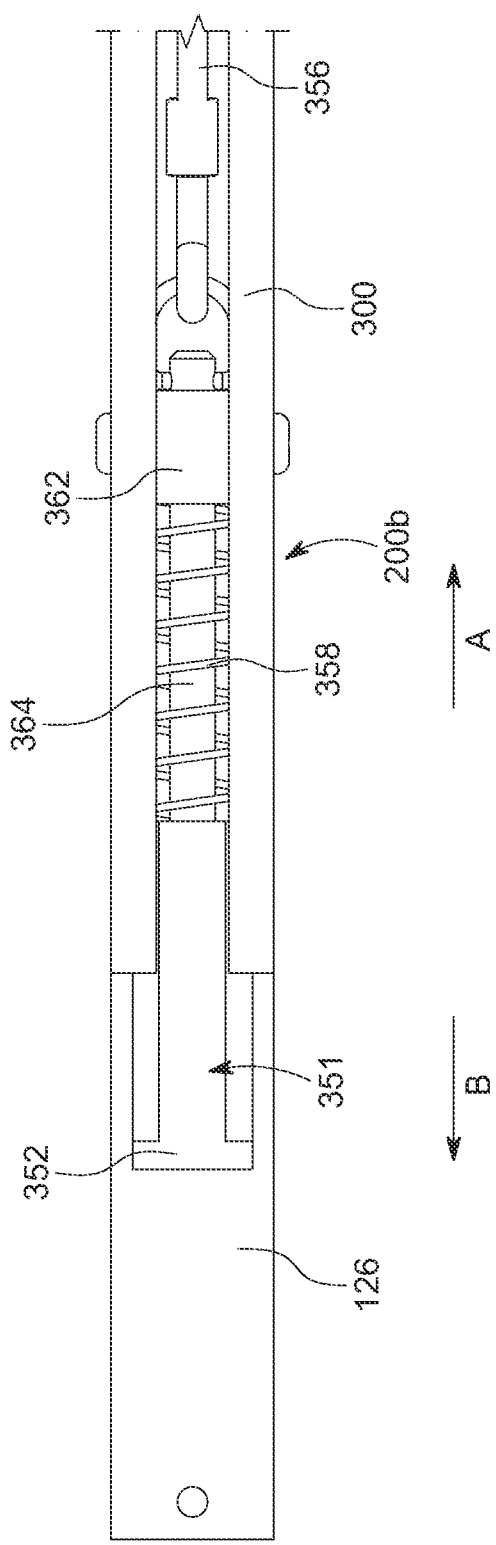
FIG. 16 illustrates a bottom view of the second coupler engaged with the second panel and depicting various components of the first lock structure of the lock assembly of FIG. 13, in accordance with an embodiment of the disclosure.

Referring to FIG. 15 and FIG. 16, an internal structure of the first lock structure 351 is shown. As shown, the first lock structure 351 includes the first lock member 352 (shown in the lock position in FIGS. 15 and 16), a block 362 arranged inside the box structure 300 of the second coupler 200b at a distance from the first lock member 352 and is fixedly attached to the box structure 300 of the second coupler 200b, and the first spring 358 disposed inside the box structure 300 of the second coupler 200b and arranged between the first lock member 352 and the block 362. The first lock member 352 is adapted to move relative to the block 362 along a length of the box structure 300 of the second coupler 200b. Further, the first spring 358 is engaged with both the first lock member 352 and the block 362, and biases the first lock member 352 into the lock position. Additionally, the first lock structure 351 includes an elongated pin 364 fixedly connected to the first lock member 352 and is movably engaged with the block 362. As shown, the elongated pin 364 extends through the block 362 via a through hole of the block 362 and is connected with string 356. Further, the elongated pin 364 extends through the first spring 358, and acts as a guide for the first spring 358. When an operator or user pulls the string 356, the elongated pin 364 is moved in a direction 'A' causing the first lock member 352 to move towards the block 362 and inside the box structure 300 of the second coupler 200b, resulting into the disengagement of the first lock member 352 from the catch 145 of the rail 126. As the elongated pin 364 and the first lock member 352 moves in the direction 'A', the first spring 358 is compressed. Accordingly, the first lock member 352 and the elongated pin 364 move in a direction 'B' opposite to the direction 'A' when the user or the operator leaves the string 356 due to the biasing force of the first spring 358, resulting into the engagement of the first lock member 352 with the catch 145 of the rail 126.

Similar to the lock assembly 350, the cover assembly 102 includes an additional lock assembly (not shown) disposed inside the box structure 300 of the third coupler 200c to lock the third panel 122c is the open position. Additionally, the cover assembly 102 may include a lock assembly to lock the fourth panel 122d in the open position.

A method of assembling the cover assembly 102 to the bed 108 of the vehicle 100 is now described. For assembling the cover assembly 102, the seal 152 is arranged over the top surface 136 of the first sidewall 112. Before arranging or mounting the seal 152 on the top surface 136 of the first sidewall 112, the top surface 136 is cleaned by using isopropyl alcohol to remove the paint and dust from the top surface 136. It may be appreciated the seal 152 is mounted on the top surface 136 of the first sidewall 112 if there is a drop in bed liner. Similarly, another seal is mounted on a top surface of the second sidewall 114.

Subsequently, the first rail 126 and the second rail 128 are engaged with the first sidewall 112 and the second sidewall 114 respectively. Before engaging the first rail 126 with the first sidewall 112, the tailgate 116 is closed. Thereafter, the first rail 126 is positioned on the bed 108 such that that the first elongated member 130 is engaged with the top surface 136 of the first sidewall 112 such that a portion of the first elongated member 130 overlaps a part of the top surface 136 of the first sidewall 112. Also, the first rail 126 is positioned on the first sidewall 112 such that the second elongated member 138, the catch 145, the third elongated member 144, and the fourth elongated member 150 are disposed inside the bed 108 in the space 118. Further, second elongated member 138 abuts the side surface 142 of the first sidewall 112. Thereafter, the first clamp 154 and the second clamps 156 are engaged with the first rail 126 and the first sidewall 112 to securely mount the first rail 126 with the first sidewall 112. As shown, the first clamp 154 is arranged proximate to the cabin 106 and one of the second clamps 156 is mounted proximate to a center of the bed 108, while another second clamp 156 is positioned inwardly and at an offset of the tailgate 116. It may be appreciated that a downward pressure is applied on the first rail 126 when tightening the fasteners 180, 180' to the tighten the clamps 154, 156 with the first rail 126 and the first sidewall 112. The clamps 154, 156 are mounted with the first rail 126 and the first sidewall 112 such that the teeth 170 of the second elongated member 138 of the first rail 126 are engaged with the teeth 164, 164' of the first rods 160, 160', while the serrated portions 178, 178' of the second rods 162, 162' are engaged with the first sidewall 112. In this manner, the first rail 126 is mounted to the first sidewall 112 using clamps 154, 156. Similarly, the second rail 128 is mounted to the second sidewall 114 using clamps 154, 156.

Subsequently the cover 120 is positioned on the rails 126, 128 in the folded position. The cover 120 is positioned in the folded position at location proximate to the cabin 106. Upon positioning the cover 120 on the rails 126, 128, the movable panels 122b, 122c, 122d are moved to the open positions. Before moving the movable panels 122b, 122c, 122d to the open positions, the fasteners 192 are inserted through holes of the first panel 122a and attached to the second structure 182 (i.e., third member 190) of the first clamp 154, thereby fixedly attaching the first panel 122a with first clamps 154, and hence, the rails 126, 128 in the fixed position.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A cover assembly for covering a bed of a vehicle, the bed includes a base and a pair of sidewalls extending outwardly of the base defining a storage space therebetween, the cover assembly comprising:
   a plurality of panels having a first panel adapted to be fixedly attached to the bed and at least one movable panel adapted to pivot between an open position and a folded position;
   a pair of rails adapted to extend along the pair of sidewalls and adapted to attach to the pair of sidewalls, each rail including
      a first portion adapted to engage with a corresponding sidewall of the pair of sidewalls and having a T-shaped structure, and
      a second portion extending from the first portion and defining a catch therebetween; and
   at least one lock assembly for locking the at least one movable panel in the open position and including at least one lock member adapted to move between a lock position and an unlock position, wherein
      in the lock position, the at least one lock member is engaged with the catch of at least one of the pair of rails and locks the at least one movable panel in the open position, and
      in the unlock position, the at least one lock member is arranged away from the catch to enable the pivoting of the at least one movable panel from the open position to the folded position,
      wherein the first portion and the second portion together define an inverted U-shaped channel therebetween and the second portion includes an elongated member extending outwardly from the inverted U-shaped channel in a horizontal direction, and
   the cover assembly further includes a pair of first clamps adapted to engage the pair of rails with the pair of the sidewalls and the first panel with the pair of rails, each of the pair of first clamps includes
      a first structure having a first rod and a second rod movably engaged with the first rod and defining a U-shaped channel therebetween, wherein the first rod is adapted to engage with the first portion of a corresponding rail of the pair of rails and adapted to arrange inside the inverted U-shaped channel, and the second rod is adapted to engage with the corresponding sidewall, and
      a second structure having a first member adapted to couple to the elongated member of the corresponding rail, a second member extending substantially perpendicularly from the first member and a third member extending substantially perpendicularly to the second member and arranged substantially parallel to the first member, wherein the first panel is adapted to couple with the third member.

2. The cover assembly of claim 1, wherein the at least one lock assembly includes at least one spring to bias the at least one lock member in the lock position.

3. The cover assembly of claim 1, wherein the at least one lock assembly includes at least one string coupled to the at least one lock member and adapted to facilitate a movement of the at least one lock member to the unlock position from the lock position.

4. The cover assembly of claim 1, wherein the first clamp includes a threaded bolt extending through the first rod and the second rod and adapted to tighten the first rod with corresponding rail and the second rod with the corresponding sidewall.

5. The cover assembly of claim 1, wherein the cover assembly includes a plurality of couplers for coupling the plurality of panels with each other, wherein each coupler pivotally couples a pair of adjacently disposed panels.

6. The cover assembly of claim 5, wherein each coupler includes a pair of engagement structures adapted to engage with the pair of adjacently disposed panels and a hinge structure disposed between the pair of engagement structures and adapted to facilitate the pivoting of one of the pair of adjacently disposed panels relative to other of the pair of adjacently disposed panels.

7. The cover assembly of claim 6, wherein the hinge structure includes
   a pair of flexible members engaged with the pair of the engagement structures, and a plate structure disposed between the pair of flexible members and engaged with the pair of flexible members, wherein the pair of flexible members facilitates the pivoting of the pair of adjacently disposed panels.

8. The cover assembly of claim 7, wherein each flexible member includes
a flap member partially overlapping a surface of a corresponding engagement structure of the pair of engagement structures and a surface of the plate structure, and
a pair of protrusions extending downwardly and outwardly of the flap member and disposed spaced apart from each other, wherein a first protrusion of the pair of protrusions is coupled to the corresponding engagement structure and a second protrusion of the pair of protrusions is coupled to the plate structure, each of the pair of protrusions includes a cylindrical portion and a shank portion extending from the flap member to the cylindrical portion.

9. The cover assembly of claim 8, wherein
each of the pair of engagement structures includes an elongated groove, wherein the cylindrical portion of the first protrusion of each flexible member is arranged inside the elongated groove of the corresponding engagement structure, and
the plate structure includes a pair of elongated channels disposed spaced apart from each other, wherein the second protrusions of the pair of flexible members are arranged inside the pair of elongated channels.

10. A vehicle, comprising:
a bed having a base and a pair of sidewalls extending outwardly of the base defining a storage space therebetween;
a plurality of panels having a first panel fixedly attached to the bed and at least one movable panel adapted to pivot between an open position and a folded position;
a pair of rails extending along the pair of sidewalls and attached to the pair of sidewalls, each rail including
a first portion engaged with a corresponding sidewall of the pair of sidewalls and having a T-shaped structure, and
a second portion extending from the first portion and defining a catch therebetween; and
at least one lock assembly for locking the at least one movable panel in the open position, the at least one lock assembly including at least one lock member adapted to move between a lock position and an unlock position, wherein
in the lock position, the at least one lock member is engaged with the catch at least one of the pair of rails and locks the at least one movable panel in the open position, and
in the unlock position, the at least one lock member is arranged away from the catch to enable the pivoting of the at least one movable panel from the open position to the folded position,
wherein the first portion and the second portion together define an inverted U-shaped channel therebetween and the second portion includes an elongated member extending outwardly from the inverted U-shaped channel in a horizontal direction, and
the cover assembly further includes a pair of first clamps adapted to engage the pair of rails with the pair of the sidewalls and the first panel with the pair of rails, each of the pair of first clamps includes
a first structure having a first rod and a second rod movably engaged with the first rod and defining a U-shaped channel therebetween, wherein the first rod is adapted to engage with the first portion of a corresponding rail of the pair of rails and adapted to arrange inside the inverted U-shaped channel, and the second rod is adapted to engage with the corresponding sidewall, and
a second structure having a first member adapted to couple to the elongated member of the corresponding rail, a second member extending substantially perpendicularly from the first member and a third member extending substantially perpendicularly to the second member and arranged substantially parallel to the first member, wherein the first panel is adapted to couple with the third member.

11. The vehicle of claim 10, wherein the at least one lock assembly includes at least one spring to bias the at least one lock member in the lock position.

12. The vehicle of claim 10, wherein the at least one lock assembly includes at least one string coupled to the at least one lock member and adapted to facilitate a movement of the at least one lock member to the unlock position from the lock position.

13. The vehicle of claim 10, wherein the cover assembly includes a plurality of couplers for coupling the plurality of panels with each other, wherein each coupler pivotally couples a pair of adjacently disposed panels.

14. The vehicle of claim 13, wherein each coupler includes a pair of engagement structures adapted to engage with the pair of adjacently disposed panels and a hinge structure disposed between the pair of engagement structures and adapted to facilitate the pivoting of one of the pair of adjacently disposed panels relative to other of the pair of adjacently disposed panels.

15. The vehicle of claim 14, wherein the hinge structure includes
a pair of flexible members engaged with the pair of the engagement structures, and
a plate structure disposed between the pair of flexible members and engaged with the pair of flexible members, wherein the pair of flexible members facilitates the pivoting of the pair of adjacently disposed panels.

16. The vehicle of claim 15, wherein each flexible member includes
a flap member partially overlapping a surface of a corresponding engagement structure of the pair of engagement structures and a surface of the plate structure, and
a pair of protrusions extending downwardly and outwardly of the flap member and disposed spaced apart from each other, wherein a first protrusion of the pair of protrusions is coupled to the corresponding engagement structure and a second protrusion of the pair of protrusions is coupled to the plate structure.

17. The vehicle of claim 16, wherein
each of the pair of protrusions includes a cylindrical portion and a shank portion extending from the flap member to the cylindrical portion,
each of the pair of engagement structures includes an elongated groove, wherein the cylindrical portion of the first protrusion of each flexible member is arranged inside the elongated groove of the corresponding engagement structure, and
the plate structure includes a pair of elongated channels disposed spaced apart from each other, wherein the second protrusions of the pair of flexible members are arranged inside the pair of elongated channels.

18. The vehicle of claim 14, wherein the hinge structure includes a flexible member engaged with the pair of the engagement structures and extending between the pair of engagement structures, wherein the flexible member includes
- a flap member partially overlapping a surface of each of the pair of engagement structure and a surface of the plate structure, and
- a pair of protrusions extending downwardly and outwardly of the flap member and disposed spaced apart from each other, wherein a first protrusion of the pair of protrusions is disposed inside an elongated groove of one of the pair of engagement structures and a second protrusion of the pair of protrusions is arranged inside an elongated groove of other of the pair of engagement structures, and wherein each of the pair of protrusions includes a cylindrical portion and a shank portion extending from the flap member to the cylindrical portion.

* * * * *